United States Patent [19]

Goodman

[11] Patent Number: 4,963,906
[45] Date of Patent: Oct. 16, 1990

[54] FIBER-OPTICALLY COUPLED VIDEO VIEWFINDER

[76] Inventor: Ronald C. Goodman, 12320 Montana Ave., #303, Los Angeles, Calif. 90049

[21] Appl. No.: 298,070

[22] Filed: Jan. 17, 1989

[51] Int. Cl.$^5$ .............................................. G03B 13/02
[52] U.S. Cl. .................................... 354/219; 355/1; 352/171; 350/96.25
[58] Field of Search ............... 354/219, 155, 166, 199, 354/220–225; 355/1; 352/171; 350/96.25, 96.27

[56] References Cited

U.S. PATENT DOCUMENTS

| | | | |
|---|---|---|---|
| 3,068,772 | 12/1962 | MacNeille | 354/166 |
| 3,143,589 | 8/1964 | Brault et al. | 350/96.25 |
| 3,883,883 | 5/1975 | Sano et al. | 354/219 X |
| 4,017,168 | 4/1977 | Brown | 352/171 X |
| 4,541,698 | 9/1985 | Lerner | 354/219 X |
| 4,557,572 | 12/1985 | Schickedanz | 354/219 |
| 4,634,256 | 1/1987 | Berger | 355/1 |
| 4,772,902 | 9/1988 | Inoue et al. | 354/82 |

Primary Examiner—Brian W. Brown
Attorney, Agent, or Firm—Weiser & Stapler

[57] ABSTRACT

A fiber optic video viewfinder for a motion picture camera. The conventional ground glass focusing screen of the camera is replaced by a fiber optic element that comprises a fused coherent bundle of optical filaments. A front face of the fiber optic element is located at the focal plane of the camera. A video imaging device such as a photodetector array is secured to the opposite face of the fiber optic element. An image presented at the front face of the fiber optic element is transmitted through the element to the video imaging device whose electrical outputs are converted into a video image. The fiber optic element may be tapered to provide image magnification or demagnification.

39 Claims, 5 Drawing Sheets

FIBER-OPTICALLY COUPLED VIDEO VIEWFINDER

FIELD OF THE INVENTION

This invention relates to motion picture cameras and, particularly, to a video viewfinding system for a reflex motion picture camera.

BACKGROUND

Film cameras of the type typically used in professional cinematographic production provide the camera operator with an optical image corresponding to the image exposed on film. With the advent of compact video components, professional motion picture cameras have been modified to employ video pickups built into the film camera in order to allow other people to view the image seen by the camera operator through the viewfinder eyepiece. Such video pickups are also employed with remotely controlled film cameras. In this latter application, the focus of the film camera lens is controlled entirely with the aid of the video image that is presented to the camera operator.

Prior art video pickups for film cameras use the image that is focused on the ground glass screen of the camera's optical viewfinder. This image is then focused on the face of a vidicon tube or a solid-state detector array by means of a system of lenses. The depth of field associated with such lenses can introduce focusing errors. While the camera operator is attempting to focus the image which appears on the surface of the ground glass focusing screen, prior art video viewfinding systems may cause the operator to focus on an aerial image that is within the depth of field of the lens system and that is immediately ahead of or behind the ground glass surface. This problem increases as ambient light levels fall and the video system looses the ability to present good contrast and acceptable image resolution on the video monitor.

Aggravating this focusing problem is the tendency of the camera operator to replace the ground glass screen with a more translucent glass in order to pass more light to the video camera. This will diminish the intensity of the image on the surface on the ground glass in comparison with a nearby aerial image. In extremely low light level situations, the operator may remove the ground glass entirely. In either case, the likelihood of a focusing error is greatly increased.

In addition to the focusing problems discussed above, prior art video viewfinding systems that view an image on the ground glass focusing screen are limited in resolution and contrast due to the granular surface of the ground glass.

SUMMARY OF THE INVENTION

The present invention provides a video viewfinding system that overcomes the disadvantages of prior art video viewfinding systems by eliminating the conventional ground glass focusing screen. This screen is replaced with a fiber optic element consisting of a fused coherent bundle of optical filaments. A front face of this element is positioned at the focal plane that would have been occupied by the ground glass focusing screen. The rear surface of this fiber optic element is directly coupled by contact to a solid state array of photodetectors. Light received at the front surface of the fiber optic element is transmitted to the array of photodetectors, which converts the incident light into electrical signals. These signals are converted by conventional electronic means into a video signal for display to the camera operator on a video monitor. The video image thus displayed corresponds to the optical image present at the front face of the fiber optic element. Since no lenses are employed, there is no depth of field effect to introduce focusing errors. Furthermore, the image attenuation and granularity inherent in a ground glass screen is eliminated, thereby increasing resolution and contrast.

The fiber optic element may be tapered either up or down so that the front face of the element may be matched to the size of the film image and the rear face of the element may be matched to the size of the photo detector array. The system may include provisions for mounting an optical filter at the front face of the fiber optic element.

Lines or a recticle to aid in composition or to provide image measurement reference may be etched or otherwise applied directly to the front face of the fused fiber optic bundle. Color "stripe" or "mosiac" filters may also be applied directly to the front face of the fused fiber optic bundle so that color imaging may be facilitated.

BRIEF DESCRIPTIONS OF THE DRAWINGS

Figure 2:
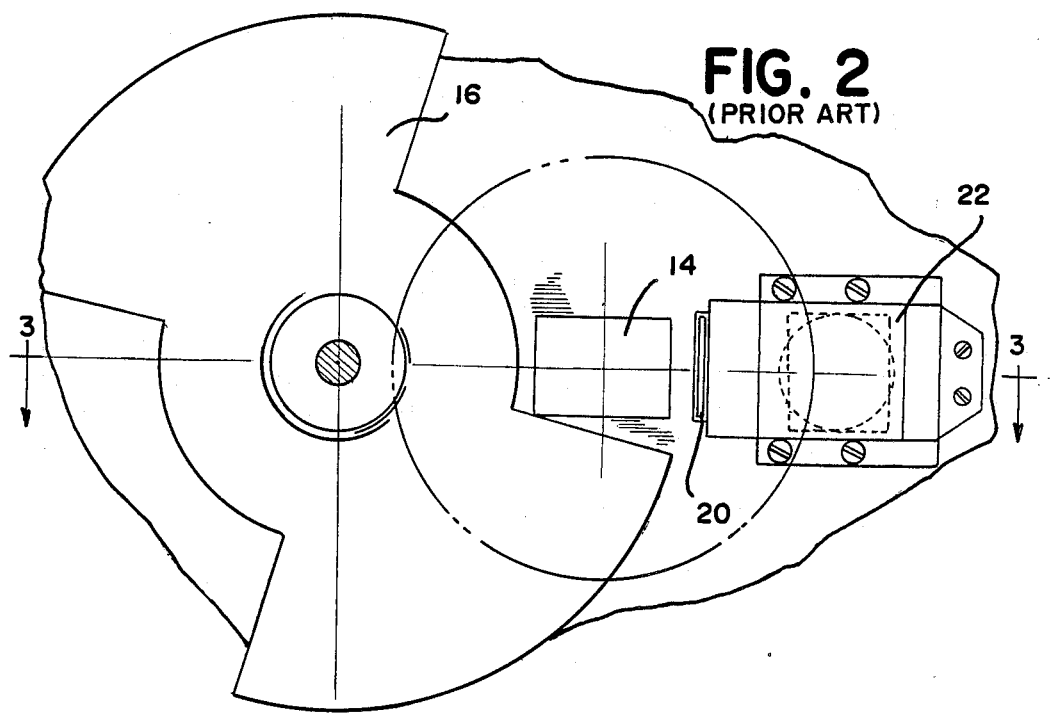
FIG. 2 is a partial cross-sectional view taken through line 2—2 of FIG. 1 showing the shutter of the camera.
Figure 3:
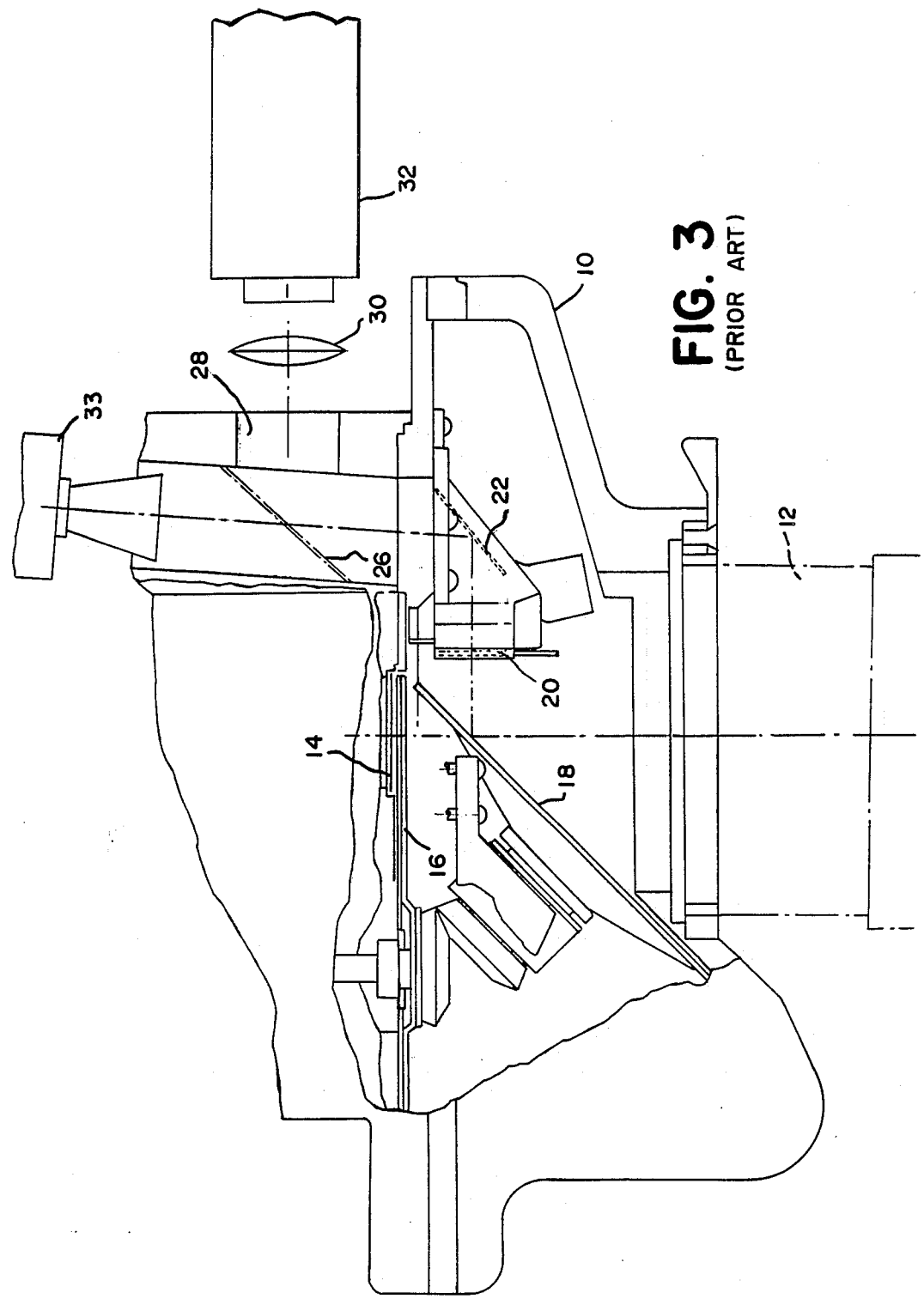

FIG. 3 a partial cross-sectional view taken through line 3—3 of FIG. 2.

Figure 1:
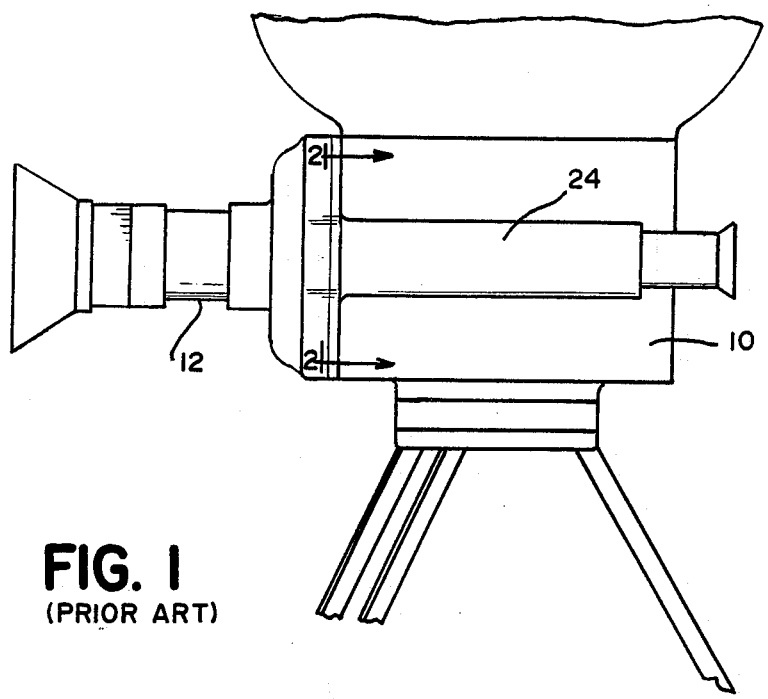
FIG. 1 illustrates a prior art motion picture camera suitable for use with the present invention.
Figure 4:
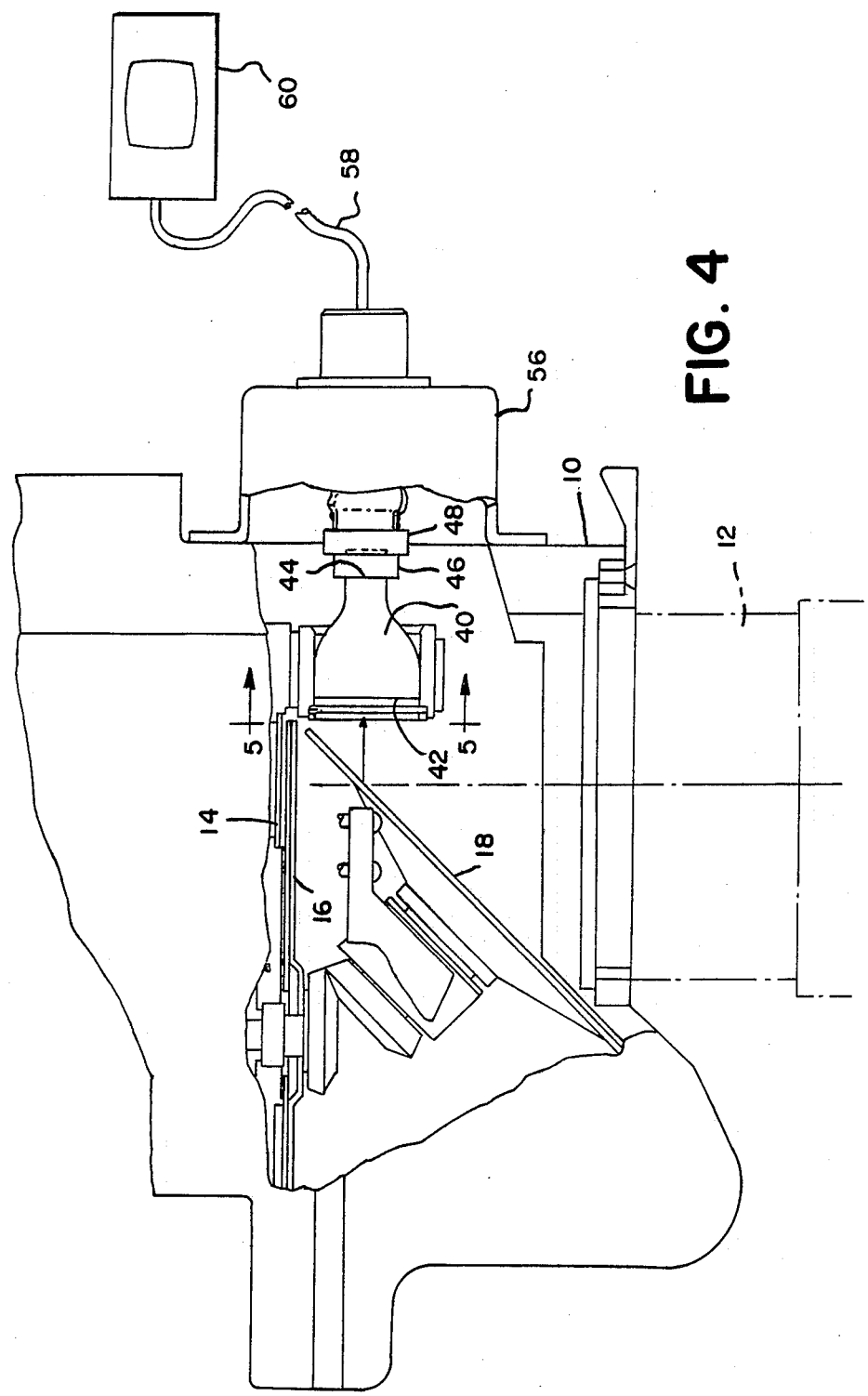

FIG. 4 a partial cross-sectional view similar to FIG. 3 illustrating the present invention in use with the camera of FIG. 1.

Figure 5:
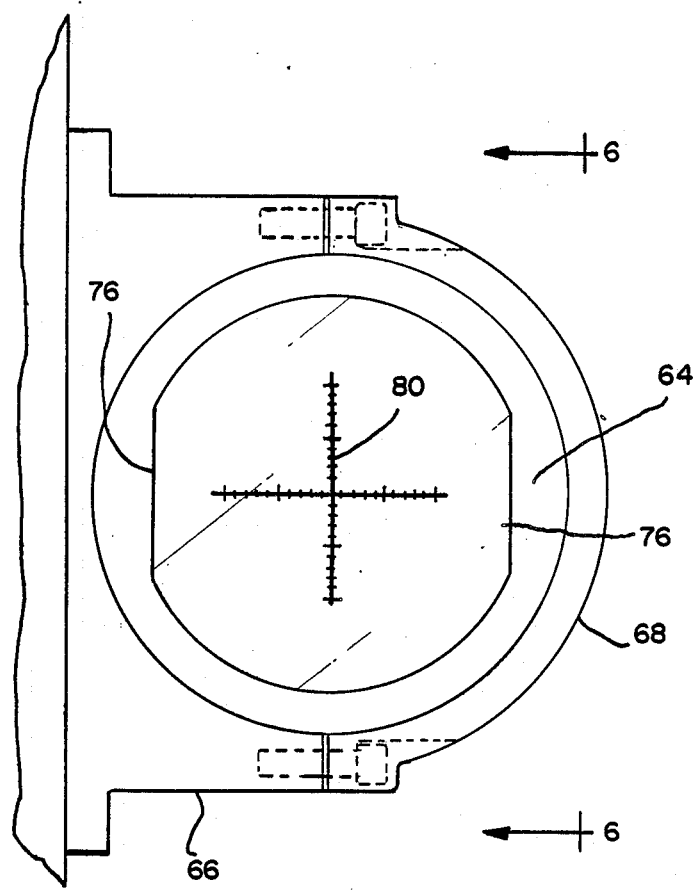

FIG. 5 is an enlarged cross-sectional view taken through line 5—5 of FIG. 4.

Figure 6:
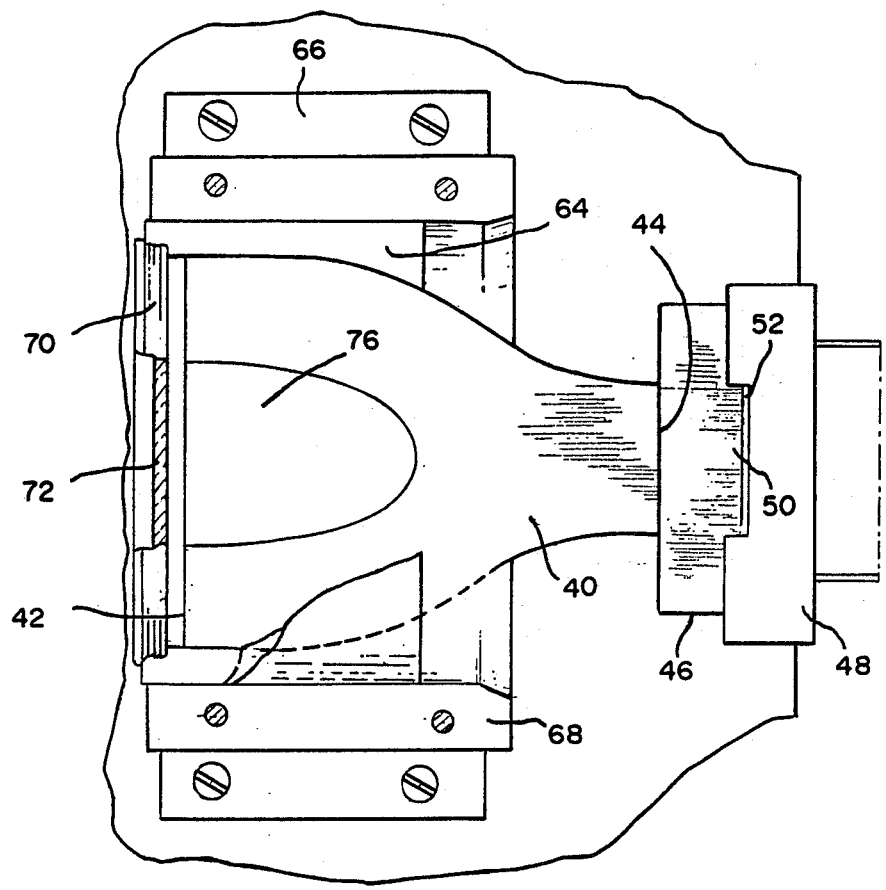

FIG. 6 a cross-sectional view taken through line 6—6 of FIG. 5.

DETAILED DESCRIPTION OF THE PREFERRED EMBODIMENT

A fiber optically coupled video viewfinder is disclosed. In the following description, for purposes of explanation and not limitation, specific numbers, dimensions, materials, etc. are set forth in order to provide a thorough understanding of the present invention. However, it will be apparent to one skilled in the art that the present invention may be practiced without these specific details.

FIGS. 1-3 illustrate a typical motion picture camera 10 of a type that is well known in the art. Light collected by lens 12 is directed toward film gate 14. Film gate 14 is obscured by shutter 16 during film advancement between exposure of successive frames. A mirrored shutter 18 in front of shutter 16 directs light during film advancement onto a focusing screen such as ground glass 20. As is well known in the art, ground glass 20 is positioned such that its distance from the surface of mirrored shutter 18 is precisely equal to the distance from the surface of mirrored shutter 18 to the emulsion surface of the film a film gate 14.

Since ground glass 20 is translucent, the image formed thereon is transmitted to mirror 22 and is reflected by mirror 22 to a conventional optical viewfinder 24.

Prior art video viewfinding systems have been adapted to cameras such as motion picture camera 10 by splitting or diverting light directed to the optical viewfinder and focusing the viewfinder image on a vidicon tube or other photosensitive detector. Referring to FIG. 3, a prior art video viewfinding system is illustrated. Mirror 26 is inserted in the optical path of the viewfinder. Mirror 26 may be either fully reflecting or partially reflecting so that the optical viewfinder may be used simultaneously. Light reflected by mirror 26 passes through aperture 28 and is focused by lens 30 onto video pickup 32. Alternatively, a video pickup 33 may be installed in place of optical viewfinder 24. Video viewfinding systems such as illustrated in FIG. 3 suffer the disadvantages that have previously been discussed.

Referring now to FIGS. 4-6, an improved video viewfinding system according to the present invention is illustrated. Camera 10 is identical to that previously described; however, the conventional ground glass focusing screen and optical viewfinder have been removed. As best seen in FIG. 4, light reflected by mirror 18 is directed to face 42 of a fiber optic element such as taper 40. Taper 40 comprises a bundle of optical filaments that has been selectively stretched in an axial direction to create the tapered shape. Each individual filament in taper 40 occupies the same relative position on each of faces 42 and 44 with respect to the axis of the taper. Thus, a focused image incident on face 42 is preserved through the taper and appears at face 44 reduced in size. In the embodiment illustrated in FIG. 4, face 42 of fiber optic taper 40 is placed at the same position formerly occupied by ground glass 20 as shown in FIG. 3. Face 44 of fiber optic taper 40 abuts fiber optic coupler 46, which serves as an adapter to directly couple, by contact, taper 40 to photodetector array 48. Coupler 46 comprises a bundle of optical filaments similar to taper 40 but which has not been stretched. End 50 of coupler 46 is machined to fit within recess 52 of photodetector array 48 so as to be in near intimate contact with the photodetecting elements A film of clear optical grease is applied to end 50 of coupler 46 during assembly. Taper 40, coupler 46 and photodetector array 48 are conveniently bonded to one another with a suitable adhesive such as epoxy.

Front face 42 of the taper 40 preferably has an area at least as large as the film frame of camera 10 so that the entire film image may be captured. In a typical 35 mm motion picture camera, the image area for a full gate aperture measures approximately 0.980 by 0.735 inches. Furthermore, rear face 44 of taper 40 preferably has an area approximately matched to the active area of photodetector array 48 so that the entire image captured at front face 42 is detected. Photodetector arrays suitable for use with the present invention have active areas approximately 0.35 inches across. Thus, taper 40 has an image reduction factor of approximately 3. It is to be understood, however, that, whereas taper 40 acts as an image reducer, other embodiments may involve image enlargement or no change in image size, depending on the particular film format and detector device used. Such variations are merely a matter of design choice.

In the preferred embodiment, photodetector array 48 is a charge coupled device as are well known in the art. However, the invention is not limited to such a device, and other types of solid-state photodetectors or other photosensitive devices, such as a video imaging, or vidicon, tube, can be employed.

Electrical signals generated by photodetector array 48 in response to light incident thereon are sent to display unit 60 through electrical cable 58. Conventional electronic circuitry within display unit 60, well known in the art, processes the outputs of array 48 to produce a video image of the camera image that is focused onto face 42 of optical taper 40 (and that is also focused onto the motion picture film). As will be recognized by those skilled in the art, it may be desirable to preprocess the outputs of array 48 in circuitry placed within housing 56 before sending the signals through cable 58.

Taper 40 fits within holder 64 which is then held in place within camera 10 by bracket 66 and clamp 68. The axial position of taper 40 may be adjusted prior to securing clamp 68 so that face 42 is precisely positioned at the focal plane. Taper 40 preferably has flats 76 machined thereon so as to insure proper alignment with the structure of camera 10. Flats 76 also define a vertical image axis for reference in bonding together taper 40 coupler 46 and photodetector array 48. Since there may be some twist in the optical filaments comprising taper 40, array 48 may be offset with respect to flats 76 in order to compensate for such twist.

Holder 64 preferably includes means such as internal threads 70 at its forward end for holding a filter 72, which may be a neutral density filter. Alternatively, a filter holder frame can be provided that may be inserted in a slot on the outside of the camera body.

Face 42 of taper 40 may be provided with lines or scales such as reticle 80 to aid in image composition or to provide a measurement reference for measuring objects within the image. Reticle 80 may be etched into face 42 or may be otherwise applied directly thereto such as by printing, decals, adhesive transfers or the like. In place of or in addition to a reticle, color "stripe" or "mosiac" filters may also be applied directly to the front face of the fused fiber optic bundle so that color imaging may be facilitated.

It will be recognized that the above described invention may be embodied in other specific forms without departing from the spirit or essential characteristics of the disclosure. Thus, it is understood that the invention is not to be limited by the foregoing illustrative details except as set forth in the appended claims.

I claim:

1. An improved video viewfinding system for a reflex camera which permits viewing a formed image independently of an eye piece comprising:

a fiber optic element having a plurality of fused coherent optical filaments arranged in a bundle, said fiber optic element having a first and a second transverse face at first and second ends of said bundle respectively, said fiber optic element disposed such that a focused reflex image formed by the camera is formed on said first face, photodetector means for converting and in response to light emitted from said second face into an electrical signal, the fiber optic element extending only from the position of its first end to the photodetector means, the second transverse face of the fiber optic element being in near intimate contact with the photodetector means, electrical means for transmitting the electrical signal generated by the photodetector to a video monitor means for receiving said electrical signal and/or producing a video image in response thereto, whereby said video image is a representation of said reflex image formed by the camera.

2. The improved video viewfinding system of claim 1 wherein the fiber optic element is in a fixed position.

3. The improved video viewfinding system of claim 2 wherein the fiber optic element in a fixed position has its first face at the reflex plane and its second face abutting an optic coupler in direct contact with the photodetector means.

4. The improved video viewfinding system of claim 2 which comprises a housing within which the fiber optic element is fully positioned.

5. The improved video viewfinding system of claim 4 wherein the fiber optic element is a unitary element.

6. The improved video viewfinding system of claim 5 wherein the fiber optic element is a tapered element of optical filaments stretched in an axial direction to create an image reduced in size.

7. The improved video viewfinding system of claim 6 wherein the fiber optic element is coupled to the photodetector means by a bundle of unstretched optical filaments.

8. The improved video viewfinding system of claim 7 wherein the bundle of unstretched optical filament which is coupled to the fiber optic element is positioned within the housing.

9. The improved video viewfinding system of claim 2 wherein the fiber optic element provides image magnification.

10. A video viewfinding system for a reflex camera which permits viewing a formed image independently of an eye piece comprising:
   a fiber optic element fixed in one position and having a plurality of fused coherent optical filaments arranged in a bundle, said fiber optic element having a first and a second transverse face at first and second ends of said bundle respectively, said fiber optic element disposed such that a focused reflex image formed by the camera is formed on said first face, wherein said fiber optic element has optical filaments in an axially stretched portion at said second end thereof and an unstretched portion at said first and thereof such that said first face has a larger area than said second face;
   photodetector means for converting light emitted from said second face into an electrical signal, and
   the fiber optic element extending only from the position of its first end to the photodetector means,
   the second transverse face of the fiber optic element being in near intimate contact with the photodetector means,
   electrical means for transmitting the electrical signal generated by the photodetector,
   video monitor means for receiving said electrical signal and producing a video image in response thereto,
   whereby said video image is a representation of said aerial image formed by the camera.

11. The video viewfinding system of claim 10 further comprising fiber optic coupling means for coupling said second face to said detector means.

12. A video viewfinding system for a reflex camera which permits viewing a formed image independently of an eye piece comprising:
   a fiber optic element fixed in one position and having a plurality of fused coherent optical filaments arranged in a bundle, said fiber optic element having a first transverse face and a second transverse face larger in area than said first transverse face, such that an image focused on said first transverse face appears at said second transverse face with a magnification factor, said fiber optic element disposed such that a focused reflex image formed by the camera is formed on said first face;
   photodetector means optically coupled to said second transverse face for receiving light emitted therefrom and converting said light into an electrical signal;
   the fiber optic element extending only from the position of its first end to the photodetector means,
   the second transverse face of the fiber optic element being in near intimate contact with the photodetector means,
   electrical means for transmitting the electrical signal generated by the photodetector,
   video monitor means for receiving said electrical signal and producing a video image in response thereto;
   whereby said video image is a representation of said aerial image formed by the camera.

13. The video viewfinding system of claim 12 further comprising adjustment means for positioning said fiber optic element such that said aerial image is focused on said first face.

14. The video viewfinding system of claim 12 further comprising filter retention means adjacent to said first face for retaining an optical filter.

15. The video viewfinding system of claim 12 wherein said photodetector means comprises a charge coupled device.

16. The video viewfinding system of claim 12 wherein said photodetector means comprises a video imaging tube.

17. The video viewfinding system of claim 12 further comprising reticle means disposed on said first face of said fiber optic element.

18. The video viewfinding system of claim 12 further comprising color filter means disposed on said first face of said fiber optic element.

19. An improved video viewfinding system for a reflex camera which provides image transmission by means of fixed optic fiber means and by electrical means and which permits video viewing of a formed image first received by the fiber optic means and then transmitted by electrical means to a video monitor, which system comprises, in combination,
   (1) a housing,
   (2) a fiber optic element of a bundle of fused coherent optical filaments the optic element being adjustably fixed in a position within the housing, the fiber optic element having a front face positioned at the reflex image plane on which is focused the entire reflex image formed by the camera, and a rear face positioned inner intimate contact with
   (3) photodetector means, the optic element extending only from the reflex image plane to the position in near intimate contact with the photodetector means, said optic element transmitting the focused image incident on he front face through the element and undistorted to the rear face, the photodetector means converting the transmitted to and emitted from the rear face of the optic element into an electrical signal,
   (4) electronic means for converting said signal into a video signal and,
   (5) video monitor means for receiving and displaying said video signal as an optical image representing the corresponding to the focused optical image formed on the front face of the optic element.

20. The improved video viewfinding system of claim 19 wherein the rear face of the optic element is coupled to the photodetector means by an optic coupler, opposite ends of which are in direct contact with the rear face of the optic element and the photodetector means, respectively.

21. The improved video viewfinding system of claim 20 wherein the optic element is in a position that is axially adjustable.

22. The improved video viewfinding system of claim 21 which comprises adjustment means for positioning the optic element in a fixed position so that its front face is coincident with the entire reflex image plane formed thereon.

23. The improved video viewfinding system of claim 22 wherein the entire reflex image plane formed on the front face is a single image.

24. The improved video viewfinding system of claim 22 wherein the photodetector means is a charge coupled device.

25. The improved video viewfinding system of claim 22 which comprises reticle means disposed on the front face of the fiber optic element.

26. The improved video viewfinding system of claim 22 which comprises color filter means disposed on the front face of the fiber optic element.

27. The improved video viewfinding system of claim 26 which comprises in addition, a strip or mosaic filter applied directly to the front face of the optic element.

28. The improved video viewfinding system of claim 21 wherein the optic element has means thereon to insure its proper alignment with the camera.

29. The improved video viewfinding system of claim 28 wherein the means define a vertical image axis for reference in uniting together the fiber optic element and the photodetector means through the coupler.

30. The improved video viewfinding system of claim 22 wherein the fiber optic element is a unitary element.

31. The improved video viewfinding system of claim 30 wherein the fiber optic element is tapered, thereby creating an image reduced in size.

32. The improved video viewfinding system of claim 31 wherein the fiber optic element is coupled to the photodetector means by a bundle of unstretched optical filaments.

33. The improved video viewfinding system of claim 32 wherein the unstretched optical filaments are positioned fully in the housing.

34. A method for video viewing an image transmitted through a reflex camera which has a housing and a lens, a fiber optic element of a bundle of fused coherent optical filaments, the optic element being fixed in a position within the housing, the optic element having a front face positioned at the reflex image plane on which is focused a reflex image formed by the camera, and a rear face positioned in near intimate contact with a photodetector means, an electronic means and a video monitor means, the fiber optic element extending only from the position of its first end to the photodetector means and the second transverse face of the fiber optic element which is in near intimate contact with the photodetector means which comprises, receiving a focused reflex image collected by the camera lens on the front face of the fixed optic element, transmitting the image incident on the front face through the optic element preserved and undistorted to the rear face of the optic element, converting the light representing the image emitted from the rear face of the optic element into an electrical signal by means of the photodetector means, converting said electrical signal into a video signal, and receiving and displaying said signal as an optical image representing the optic image formed on the front face of the optic element on the video monitor means which image is free of depth of field effect, thereby increasing resolution and contrast.

35. The method of claim 34 which comprises passing the light representing the image from the first to the second face through the fixed optic element which is tapered, thereby reducing the size of the image which appears at the rear face of the optic element as compared to the size of the incident image on the front face of the optic element.

36. The method of claim 35 which comprises passing the light representing the image from the first to the second face through an optic element of which the two faces are of substantially the same area, thereby the size of the image which appears at the rear face of the optic element as compared to the size of the incident image on the front face of the fixed optic element.

37. The method of claim 35 which comprises passing the light image incident on the rear face of the optic element through a fiber optic coupler of unstretched optical filaments directly to the photodetector means.

38. The method of claim 37 which comprises adjusting the position of the optic element in a fixed position for its front face to be coincident with the reflex image formed on the front face, thereby improving the sharpness of the picture viewed on the video monitor means.

39. The method of claim 38 wherein the photodetector means is a charge couple device for converting the light image to an electrical signal.

* * * * *